United States Patent
Yun (10) Patent No.: US 12,375,550 B2
(45) Date of Patent: Jul. 29, 2025

(54) TRANSMISSION OF FILES VIA RELAY SERVER

(71) Applicant: Rakuten Symphony, Inc., Tokyo (JP)

(72) Inventor: Taehyeon Yun, Seoul (KR)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/269,363

(22) PCT Filed: Jan. 5, 2023

(86) PCT No.: PCT/KR2023/000221
§ 371 (c)(1),
(2) Date: Jun. 23, 2023

(87) PCT Pub. No.: WO2024/147385
PCT Pub. Date: Jul. 11, 2024

(65) Prior Publication Data
US 2024/0422211 A1    Dec. 19, 2024

(51) Int. Cl.
*H04L 67/06*        (2022.01)
*H04L 67/1021*      (2022.01)
*H04L 67/104*       (2022.01)

(52) U.S. Cl.
CPC .......... *H04L 67/06* (2013.01); *H04L 67/1021* (2013.01); *H04L 67/104* (2013.01)

(58) Field of Classification Search
CPC .... H04L 67/06; H04L 67/1021; H04L 67/104
See application file for complete search history.

(56) References Cited

U.S. PATENT DOCUMENTS

| | | | | |
|---|---|---|---|---|
| 8,638,356 B2* | 1/2014 | Sunkara | .................. | H04L 65/61 |
| | | | | 348/14.11 |
| 2003/0208693 A1* | 11/2003 | Yoshida | ................ | H04L 67/565 |
| | | | | 713/150 |
| 2004/0049700 A1* | 3/2004 | Yoshida | .................. | H04L 63/04 |
| | | | | 714/E11.125 |
| 2010/0205279 A1* | 8/2010 | Takakura | ................ | H04L 67/06 |
| | | | | 709/219 |
| 2014/0082154 A1* | 3/2014 | Lin | ......... | H04L 67/06 |
| | | | | 709/219 |
| 2016/0065683 A1* | 3/2016 | Saito | ...................... | G06F 3/1287 |
| | | | | 709/203 |
| 2017/0085633 A1* | 3/2017 | Kim | .................... | H04L 67/1097 |
| 2017/0250861 A1* | 8/2017 | Gheorghe | .............. | H04L 67/01 |

* cited by examiner

*Primary Examiner* — Benjamin M Thieu
(74) *Attorney, Agent, or Firm* — Sughrue Mion, PLLC (57) ABSTRACT

The present disclosure proposes an electronic apparatus. An electronic apparatus according to the present disclosure may include a communication circuit, one or more processors, and one or more memories. The one or more processors may receive a request for transmission of a particular file from a transmitting terminal, determine a first relay server to which the particular file is to be uploaded by the transmitting terminal, based on a location of the transmitting terminal, among a first relay server set including one or more relay servers, and determine a second relay server set including one or more relay servers in which the particular file is to be stored, among the first relay server set.

14 Claims, 9 Drawing Sheets

TRANSMISSION OF FILES VIA RELAY SERVER

TECHNICAL FIELD

The present disclosure relates to transmission of files via a relay server.

BACKGROUND

In advancement of communication technologies and file transmission technologies, higher file transmission rates are required. File transmission includes transmission via peer-to-peer (P2P) communication, transmission via a cloud server, and the like. In general, file transmission via P2P communication may have a higher file transmission rate than file transmission via a cloud server. However, conventionally, because files are not transmitted using different methods depending on the situation, file transmission rates need to be improved.

In addition, even when files are transmitted via a cloud server, conventional file downloads from a server far from the recipient provide relatively low file transmission rates. Therefore, it is necessary to improve file transmission rates in order to solve the above-mentioned matters.

SUMMARY

The present disclosure provides a file transmission technology via a relay server.

An electronic apparatus according to one embodiment of the present disclosure may include a communication circuit, one or more processors, and one or more memories. The communication circuit may communicate with a transmitting terminal. The one or more memories may store instructions which, when executed by the one or more processors, cause the one or more processors to perform computations. The one or more processors may receive a request for transmission of a particular file from the transmitting terminal, determine, among a first relay server set including one or more relay servers, a first relay server to which the particular file is to be uploaded by the transmitting terminal, based on a location of the transmitting terminal, and determine, among the first relay server set, a second relay server set including one or more relay servers in which the particular file is to be stored.

A method according to one embodiment of the present disclosure may include the operations of receiving a request for transmission of a particular file from a transmitting terminal, determining a first relay server to which the particular file is to be uploaded by the transmitting terminal, based on a location of the transmitting terminal, among a first relay server set including one or more relay servers, and determining a second relay server set including one or more relay servers in which the particular file is to be stored, among the first relay server set.

According to the present disclosure, a file transmission technology via a relay server may be provided.

According to the present disclosure, the file transmission rate may be improved.

According to the present disclosure, a higher file transmission rate may be provided when file transmission via P2P communication is possible.

DETAILED DESCRIPTION

Various embodiments described herein are examples for clearly explaining the technical spirit of the present disclosure, and are not intended to be limited to specific embodiments. The technical spirit of the present disclosure encompasses various modifications, equivalents, and alternatives of respective embodiments described herein, as well as an embodiment selectively combined from all or part of each embodiment. In addition, the scope of the claims of the technical spirit of the present disclosure is not limited by various embodiments presented below or detailed descriptions thereof.

Terms used herein, including technical or scientific terms, may have meanings that are generally understood by a person having ordinary knowledge in the art to which the present disclosure pertains, unless otherwise specified.

The expressions "include", "may include", "be provided with", "may be provided with", "have", "may have", and the like used herein mean that a feature (for example, function, operation, element, or the like) that becomes an object exists, and does not exclude the existence of other additional features. That is, such expressions should be understood as open-ended terms connoting the possibility of inclusion of other embodiments.

A singular expression used herein may include meanings of plurality, unless otherwise mentioned, and the same is applied to a singular expression stated in the claims.

The terms "first", "second", and the like used herein are used to identify a plurality of objects of the same kind from one another, unless otherwise mentioned, and are not intended to limit the order or importance of the relevant objects. For example, sizes according to the present disclosure may expressed such as "a first size", "a second size", "a third size", and "a fourth size" and thus identified from one another.

The expressions "A, B, and C", "A, B, or C", "A, B, and/or C" or "at least one of A, B, and C", "at least one of A, B, or C", "at least one of A, B, and/or C", and the like used herein may denote each enumerated item or all possible combinations of enumerated items. For example, "at least one of A or B" may denote all of the following: (1) at least one of A, (2) at least one of B, and (3) at least one of A and at least one of B.

The expression "based on" used herein is used to describe one or more factors that influence a decision, an action of judgment or an operation described in a phrase or sentence including the relevant expression, and the expression does not exclude additional factor influencing the decision, the action of judgment or the operation.

When a certain component (for example, first component) is described herein as "coupled to" or "connected to" another component (for example, second component), it should be understood as having meaning that the certain component may be coupled or connected directly to the other component or that the certain component may be coupled or connected to the other component via a new intervening component (for example, third component).

The term "configured to" used herein may mean, depending on the context, "set to", "having the ability to", "modified to", "made to", "capable of", and the like. The expression is not limited to the meaning "specially designed in terms of hardware", and a processor configured to perform a specific operation, for example, may denote a generic purpose processor capable of performing the specific operation by executing software, or a special purpose computer structured via programming so as to perform the specific operation.

Hereinafter, various embodiments of the present disclosure will be described with reference to the accompanying drawings. In the accompanying drawings and descriptions with reference to the drawings, identical or substantially equivalent components may be indicated by identical reference numerals. Furthermore, in the following description of various embodiments, repeated descriptions of the identical or relevant components will be omitted. However, even if description of a component is omitted, such a component is not intended to be excluded in an embodiment.

Figure 1:
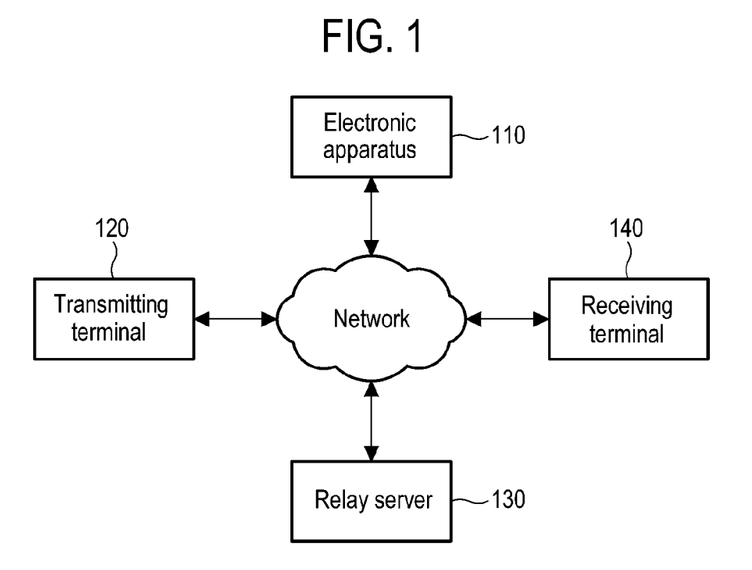
FIG. 1 illustrates an environment to which an electronic apparatus according to an embodiment of the present disclosure is applicable.

FIG. 1 illustrates an environment to which an electronic apparatus according to an embodiment of the present disclosure is applicable. The electronic apparatus 110 may be connected, via a network, to a transmitting terminal 120, a relay server 130, and a receiving terminal 140, thereby communicating with each other.

The electronic apparatus 110 may be an electronic apparatus which provides a file transmission service. For example, the electronic apparatus 110 may be a management server which provides and manages a file transmission service.

In an embodiment, a user may use the file transmission service provided by the electronic device 110, via a user terminal. Hereinafter, the term "user terminal" may be used interchangeably with "transmitting terminal 120" or "receiving terminal 140". A user who wants to transmit a file may transmit the file to a recipient via a user terminal, also referred to as a transmitting terminal 120. In addition, a user who wants to receive a file may download the file via a user terminal also referred to as a receiving terminal 140. The transmitting terminal 120 and the receiving terminal 140 may be some of user terminals with which the electronic apparatus 110 communicates.

A user terminal also referred to as a transmitting terminal 120 or a receiving terminal 140 may be a device used by a user to use a file transmission service. The user terminal may be implemented as a terminal capable of transmitting and receiving various pieces of information with the electronic apparatus 110 via a network. For example, the user terminal may be one of a computer, a laptop, a mobile communication terminal (for example, a smartphone), a mobile multimedia device, a wearable device, or an HMD. However, the type of the user terminal is not limited thereto, and the user terminal may be any device including an input and output interface via which information can be input from the user, or via which information can be output to the user, and capable of communicating with the electronic apparatus 110 or other apparatuses via a network.

The user terminal also referred to as a transmitting terminal 120 or a receiving terminal 140 may provide information received from the electronic apparatus 110 to the user, and may receive an input from the user and transmit the same to the electronic apparatus 110. The input acquired from the user may include various types of inputs such as clicks using with a mouse, touches using with a touchpad or a touchscreen, voice recognition, and other types of electromagnetic inputs.

The electronic apparatus 110 may be connected, via a network, to a relay server 130 operating as a file repository in a file transmission service, thereby communicating with each other. A relay server may include a repository in which files are stored, a communication circuit which communicates with the electronic apparatus 110, and a processor which performs various commands to, for example, store files in the repository or delete files therefrom. In an embodiment, the electronic apparatus 110 may be connected to multiple relay servers such that, upon receiving a request for transmission of a particular file from the transmitting terminal 120, the electronic apparatus 110 determines, among multiple relay servers constituting a first relay server set, a first relay server to which the transmitting terminal 120 is to upload the particular file and one or more relay servers constituting a second relay server set, in which the particular file is to be stored. The electronic apparatus 110 may have the particular file uploaded to the determined first relay server and may have the particular file stored in the second relay server set. The electronic apparatus 110 may generate a link for downloading the particular file from the second relay server set and may transfer the generated link to the transmitting terminal 120.

The network may operate to communicably connect the electronic apparatus 110, the transmitting terminal 120, the relay server 130, and the receiving terminal 140. For example, the network may provide an access path such that a user terminal also referred to as the transmitting terminal 120 or the receiving terminal 140 is connected to the electronic apparatus 110 and the relay server 130 and may transmit and receive packet data. The network may be implemented as any kind of wired or wireless network such as a local area network (LAN), a wide area network (WAN), a mobile radio communication network, or a wireless broadband (WiBro), for example.

Figure 2:
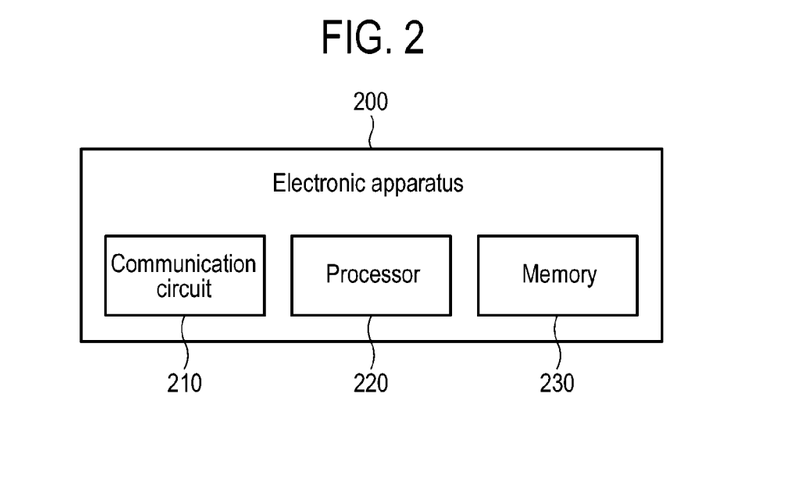
FIG. 2 is a block diagram of an electronic apparatus according to an embodiment of the present disclosure.

FIG. 2 is a block diagram of an electronic apparatus 200 according to an embodiment of the present disclosure. In an embodiment, the electronic apparatus 200 may include at least one of a communication circuit 210, one or more processors 220, or one or more memories 230 as components thereof. In an embodiment, components of the electronic apparatus 200 may be omitted, or other components may be added to the electronic apparatus 200. In an embodiment, additionally or alternatively, some components may be implemented in an integrated manner, or implemented as a singular entity or multiple entities. In the present disclosure, one or more processors 220 may be referred to as a processor 220. The expression "processor 220" may denote a single processor or a set of more than one processors unless otherwise mentioned specifically. In the present disclosure, one or more memories 230 may be referred to as a memory 230. The expression "memory 230" may denote a single memory or a set of more than one memories unless otherwise mentioned specifically. In an embodiment, at least some of the internal and external components of the electronic apparatus 200 may be connected to each other via a bus, a general purpose input/output (GPIO), a serial peripheral interface (SPI), or a mobile industry processor interface (MIPI) so as to exchange information (data, signals, and the like).

The communication circuit 210 may communicate with a user terminal. The communication circuit 210 may perform wireless or wired communication between the electronic apparatus 200 and the user terminal. For example, the communication circuit 210 may perform wireless communication according to a scheme such as eMBB (enhanced Mobile Broadband), URLLC (Ultra Reliable Low-Latency Communications), MMTC (Massive Machine Type Communications), LTE (Long-Term Evolution), LTE-A (LTE Advance), NR (New Radio), UMTS (Universal Mobile Telecommunications System), GSM (Global System for Mobile communications), CDMA (Code Division Multiple Access), WCDMA (Wideband CDMA), WiBro (Wireless Broadband), WiFi (Wireless Fidelity), Bluetooth, NFC (Near Field Communication), GPS (Global Positioning System), or GNSS (Global Navigation Satellite System). For example, the communication circuit 210 may perform wired communication according to a scheme such as USB (Universal Serial Bus), HDMI (High Definition Multimedia Interface), RS-232 (Recommended Standard-232), or POTS (Plain Old Telephone Service). In an embodiment, the electronic apparatus 200 may be integrated with another apparatus and implemented as such. In the present case, the communication circuit 210 may function as a connection circuit or an interface connecting the electronic apparatus 200 and the other apparatus.

The processor 220 may drive software (for example, commands, programs, and the like) so as to control at least one component of the electronic apparatus 200 connected to the processor 220. In addition, the processor 220 may perform various operations related to the present disclosure, such as computation, execution, data generation, and processing. In addition, the processor 220 may load data and the like from the memory 230 or store the same in the memory 230. Moreover, the processor 220 may control the communication circuit 210 so as to transmit and receive various pieces of information with a user terminal and a relay server. In an embodiment, the processor 220 may control the communication circuit 210 so as to transmit various pieces of data related to a file transmission service to the user terminal.

In an embodiment, the processor 220 may receive a request for transmission of a particular file from a transmitting terminal via the communication circuit 210. The transmitting terminal may send a request for transmission of a particular file via a web site, a program, or an application that provides a file transmission service. For example, if the user inputs a request for transmission of a particular file via the transmitting terminal, the transmitting terminal may transfer information indicating the request for transmission of a particular file to the electronic apparatus 200.

In response to receiving a request for transmission of a particular file from the transmitting terminal, the processor 220 may determine, among a first relay server set including one or more relay servers, a first relay server to which the transmitting terminal is to upload the particular file, based on a location of the transmitting terminal. The first relay server set may refer to a set of one or more relay servers which are managed by the electronic apparatus 200, and in which files can be stored. Preferably, relay servers included in the first relay server set may be distributed widely and located across various areas. In addition, the processor 220 may acquire the IP address of the transmitting terminal concurrently with receiving the request for transmission of a particular file from the transmitting terminal. The processor 220 may determine the location of the transmitting terminal, based on the IP address of the transmitting terminal. The operation of the processor 220 for determining, based on the location of the transmitting terminal, a first relay server to which a particular file is to be uploaded by the transmitting terminal will be described later in detail with reference to FIG. 3.

The processor 220 may determine, among the first relay server set, a second relay server set including one or more relay servers in which the particular file is to be stored. The operation of the processor 220 for determining the second relay server will be described later in detail with reference to FIG. 5.

The memory 230 may store various pieces of information (data). Information stored in the memory 230, which is acquired, processed, or used by at least one component of the electronic apparatus 200, may include software (for example, instructions, programs, and the like). The memory 230 may include a volatile memory or a nonvolatile memory. In the present disclosure, commands or programs, which are software stored in the memory 230, may include an operating system for controlling resources of the electronic apparatus 200, applications, or middleware that provide various functions to applications such that the applications can utilize resources of the electronic apparatus 200. In an embodiment, the memory 230 may store instructions that, when executed by the processor 220, cause the processor 220 to perform computations. The memory 230 may store at least part of information received from a user terminal or a relay server via the communication circuit 210 or information transmitted to the user terminal or the relay server via the communication circuit 210. In addition, the memory 230 may store a list of first relay server set, information regarding files that respective first relay server set stores, locations of respective first relay server set, and the like.

Figure 3:
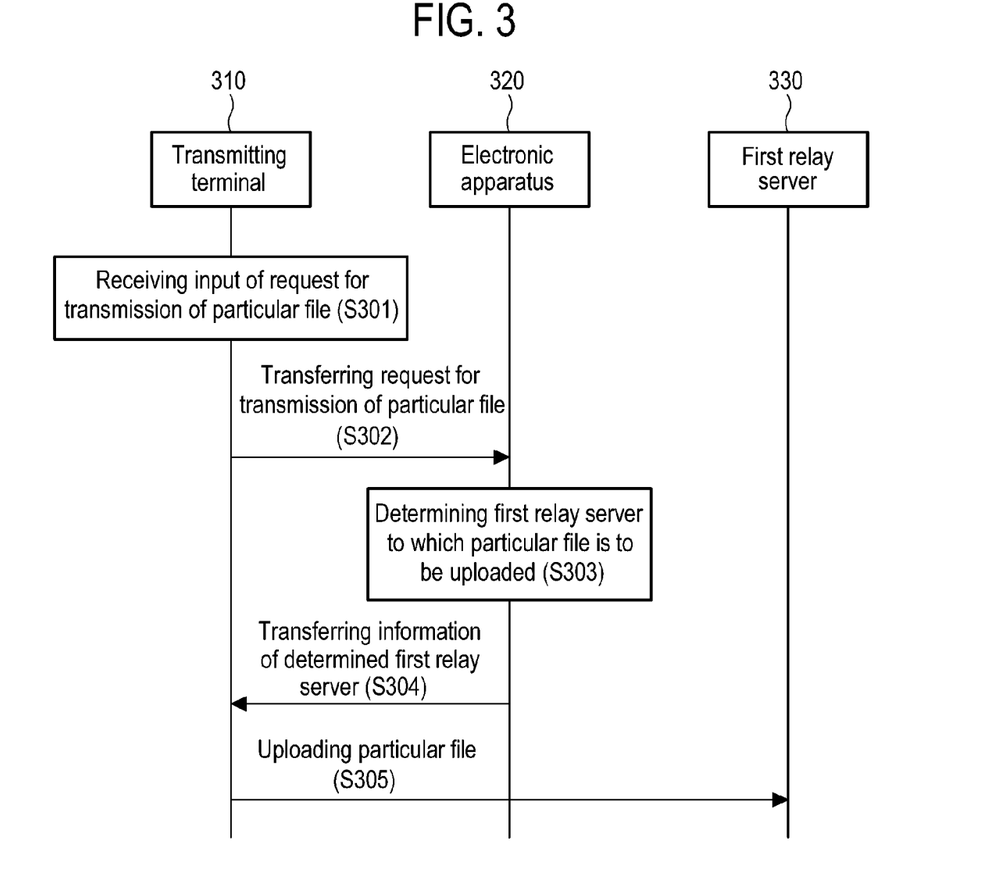
FIG. 3 illustrates operations of an electronic apparatus according to an embodiment of the present disclosure.

Operations described below as being performed by an electronic apparatus with reference to FIGS. 3 to 7 may be understood as being performed by the processor 220 of the electronic apparatus 200 described with reference to FIG. 2. FIG. 3 illustrates operations of an electronic apparatus 320 according to an embodiment of the present disclosure.

A transmitting terminal 310 may receive an input of a request for transmission of a particular file from a transmitting user (S301). For example, the transmitting terminal 310 may provide the transmitting user with a file transmission service via a program, an application, a web site, or the like. The file transmission service may be managed by the electronic apparatus 320. The transmitting user may select a particular file to be transmitted, among files stored in the transmitting terminal 310, from a user interface (UI) provided via the file transmission service, thereby inputting a request for transmission of the particular file to the transmitting terminal 310. In an embodiment, the transmitting terminal 310 may receive an additional input of information regarding a recipient or information regarding a specific geographical area, based on the request for transmission of the particular file from the transmitting user. The transmitting terminal 310 may receive an input of information regarding a recipient or information regarding a specific geographic area from the transmitting user in a UI provided via the file transmission service. The information regarding a recipient or information regarding a specific geographic area, which has been input, may be used in a process in which the electronic apparatus 320 determines a second relay server set.

The transmitting terminal 310 may transfer the request for transmission of a particular file to the electronic apparatus 320 (S302). In response to the request for transmission of a particular file that has been input from the transmitting user, the transmitting terminal 310 may transfer the request for transmission of a particular file to the electronic apparatus 320. In addition, in the process in which the transmitting terminal 310 transfers the request for transmission of a particular file to the electronic apparatus 320, the electronic apparatus 320 may acquire the IP address of the transmitting terminal 310 or information regarding the network used by the transmitting terminal 310. In an embodiment, the transmitting terminal 310 may further transfer information regarding a recipient or information regarding a specific geographic area to the electronic apparatus 320, following the request for transmission of a particular file.

The electronic apparatus 320 may determine a first relay server 330 to upload a particular file (S303). For example, the first relay server 330 may refer to a relay server to which a particular file to be transmitted by the transmitting terminal 310 will be uploaded directly (that is, without going through another relay server). In an embodiment, the electronic apparatus 320 may determine a relay server closest to the transmitting terminal 310, within the first relay server set, as the first relay server 330, based on the location of the transmitting terminal 310 and locations of the first relay server set. Specifically, the electronic apparatus 320 may compare the location of the transmitting terminal 310 determined through the IP address of the transmitting terminal 310 and each location of the first relay server set, thereby determining a relay server closest to the transmitting terminal 310 among the first relay server set. The closer to the transmitting terminal 310, the less time may be taken for the transmitting terminal 310 to upload a particular file to the corresponding relay server. Therefore, the electronic apparatus 320 may determine a relay server closest to the transmitting terminal 310 as the first relay server 330, thereby reducing the time necessary for file transmission.

The electronic apparatus 320 may transfer information regarding the determined first relay server 330 to the transmitting terminal 310 (S304). For example, the electronic apparatus 320 may provide the transmitting terminal 310 with information that may be used by the transmitting terminal 310 to specify the first relay server 330 (for example, address information of the first relay server 330) such that the transmitting terminal 310 can directly communicate with the first relay server 330 in order to upload a particular file. The transmitting terminal 310 may upload a particular file to the first relay server 330 (S305). Specifically, the transmitting terminal 310 may communicate with the first relay server 330, based on information of the first relay server 330 transferred from the electronic apparatus 320, and may upload a particular file to the first relay server 330.

Figure 4:
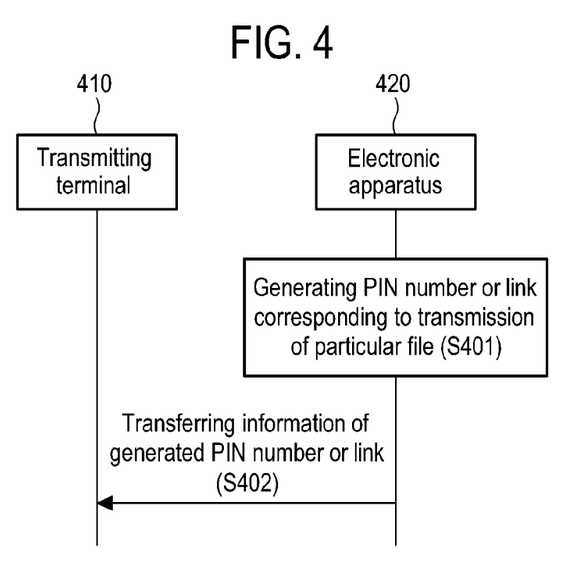
FIG. 4 illustrates operations of an electronic apparatus according to an embodiment of the present disclosure.

FIG. 4 illustrates operations of an electronic apparatus 420 according to an embodiment of the present disclosure. The electronic apparatus 420 may generate a PIN number or a link corresponding to transmission of a particular file (S401). The electronic apparatus 420 may generate a PIN number or a link corresponding to transmission of a particular file in response to transferring a request for transmission of the particular file using operation S302, for example. The PIN number or link may be information needed by a receiving user (receiving terminal) who wants to receive a transmitted file to download the particular file. For example, the PIN number may be a six-digit number, and the link may be in a form of a web address.

In an embodiment, the transmitting terminal 410 may select a file transmission method, which uses a PIN number or a link. The electronic apparatus 420 may transfer a generated PIN number or link to the transmitting terminal 410 (S402). The transmitting user may transfer the transferred PIN number or link to the receiving user via an electronic message or the like. When the transmitting user transfers the link to the receiving user via an electronic message or the like, communication between the transmitting terminal 410 and the receiving terminal may be established. In the present case, the transmitting user may conveniently copy and paste the text of the link without typing the link separately. The receiving user may copy the transferred link and paste the same in the address bar of a web site, or may click the link so as to conveniently transfer the download request to the electronic apparatus 420. When the transmitting user uses a PIN number, the transmitting user may transfer the PIN number to the receiving user via an electronic message, or may easily transfer the PIN number to the receiving user off-line or through a voice.

The receiving user may input the PIN number to the UI of the file transmission service provided via the receiving terminal or may access the link, thereby transferring a request for download of the particular file to the electronic apparatus 420. The operation of the receiving terminal for downloading the particular file will be described later in detail with reference to FIG. 6.

Figure 5:
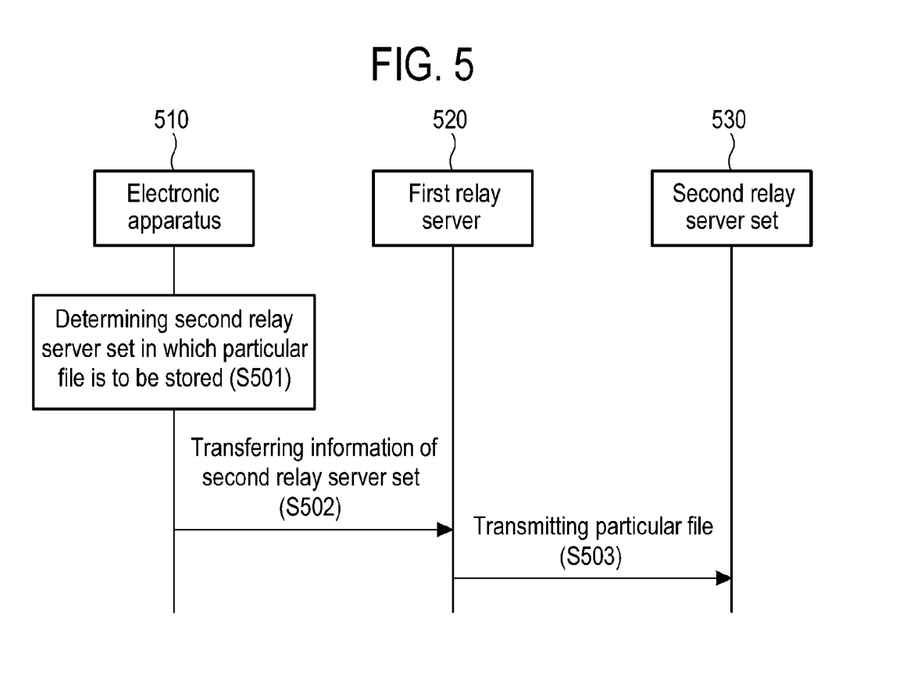
FIG. 5 illustrates operations of an electronic apparatus according to an embodiment of the present disclosure.

FIG. 5 illustrates operations of an electronic apparatus 510 according to an embodiment of the present disclosure. The electronic apparatus 510 may determine a second relay server set 530 in which a particular file is to be stored (S501). For example, operation S501 may be performed after operation S305 in FIG. 3. For example, when the transmission rate is preferentially considered over the storage space of a relay server or the resource of the relay server, the electronic apparatus 510 may immediately perform operations S501 to S503 upon receiving a request for transmission of a particular file from the transmitting terminal 310. As another example, when considering the storage space of a relay server or the resource of the relay server, the electronic apparatus 510 may perform operations S501 to S503 in response to a request for download of a particular file from the receiving terminal.

In an embodiment, when the receiving terminal is specified based on a request for transmission of a particular file, the electronic apparatus 510 may determine a second relay server set 530, based on a location of the specified receiving terminal. In the present case, the transmitting terminal may receive an input of information regarding the receiving user, based on the request for transmission of a particular file, for example. For example, when the receiving user is a user who has subscribed to the file transmission service, the transmitting terminal may receive account information of the corresponding receiving user, together with the request for transmission of a particular file, input from the transmitting user via the UI of the file transmission service. The transmitting terminal may receive an input of the account information of the receiving user in various manners in which the corresponding account can be specified. The transmitting terminal may transfer information regarding the corresponding receiving user to the electronic apparatus 510 together with the request for transmission of a particular file. Based on the received information regarding the corresponding receiving user, the electronic apparatus 510 may determine a receiving terminal accessed by the account information of the corresponding receiving user. In addition, the electronic apparatus 510 may determine the geographical location of the receiving terminal, based on the IP address of the receiving terminal, for example.

Based on the location of the receiving terminal, the electronic apparatus 510 may set a second relay server set 530 including a relay server close to the receiving terminal. For example, the electronic apparatus 510 may determine a preset number of relay servers, which are close to the location of the receiving terminal in order, as the second relay server set 530. The preset number may be one or more. As another example, the electronic apparatus 510 may determine all relay servers located in a geographical area corresponding to the location of the corresponding receiving terminal, or some relay servers satisfying another specific reference, as the second relay server set 530. The geographical area corresponding to the location of the receiving terminal may refer to a preset geographical range including the location of the receiving terminal. For example, the geographical area corresponding to the location of the receiving terminal may be a country, city, or the like in which the receiving terminal is located. A higher download rate may be provided to the receiving terminal by determining the second relay server set 530 including relay servers close to the location of the receiving terminal.

In an embodiment, the electronic apparatus 510 may determine a second relay server set including a relay server in a geographical area corresponding to the location of the transmitting terminal. For example, when no receiving terminal is specified, the electronic apparatus 510 may determine a second relay server set, based on the location of the transmitting terminal. The electronic apparatus 510 may first determine a second relay server set 530 including a relay server close to the location of the transmitting terminal. In such a case, the time taken to transmit a particular file from the first relay server 520 to the second relay server set 530 may be reduced. For example, the electronic apparatus 510 may determine all relay servers located in a geographical area corresponding to the location of the transmitting terminal, or some relay servers satisfying another specific requirement, as the second relay server set 530. In an embodiment, when the receiving terminal later downloads the particular file, the electronic apparatus 510 may add at least some relay servers located in the geographical area corresponding to the location of the corresponding receiving terminal to the second relay server set 530 and may store the particular file in the added relay servers. The operation of the electronic apparatus 510 for adding relay servers in the geographical area corresponding to the location of the receiving terminal to the second relay server set will be described later in detail with reference to FIG. 6.

In an embodiment, the electronic apparatus 510 receive information regarding the specific geographic area from the transmitting terminal, together with a transmission request, and may determine a second relay server set 530, based on the specific geographic area. For example, when the receiving user supposed to download a particular file has not been determined, and when a specific geographic area has been determined as a target, the transmitting user may input information regarding the specific geographic area to the transmitting terminal, together with a request for transmission of the particular file. For example, the transmitting terminal may receive an input of information regarding the specific geographic area from the transmitting user via the UI of the file transmission service. The specific geographic area may refer to a preset geographical range and may be, for example, a country, a city, or the like. The transmitting terminal may transfer information regarding the corresponding specific geographic area to the electronic apparatus 510. The electronic apparatus 510 may determine all relay servers located in the corresponding specific geographic area, or some relay servers satisfying another specific requirement, as the second relay server set 530. A higher download rate may be provided to the receiving terminal by determining the second relay server set 530 including relay servers in the specific geographic area.

The electronic apparatus 510 may transfer information of the second relay server set 530 to the first relay server 520 (S502). The electronic apparatus 510 may transfer information that can be used to specify each relay server of the second relay server set 530 (for example, address information of each of the second relay server set 530) to the first relay server 520. The first relay server 520 may transmit a particular file to the second relay server set 530 (S503). Specifically, the first relay server 520 may communicate with each of the second relay server set 530, based on information of the second relay server set 530, thereby transmitting a particular file to each of the second relay server set 530. The second relay server set 530 may store the received particular file therein.

In an embodiment, the electronic apparatus 510 may determine whether an error has occurred in at least a part of the communication path between the first relay server set, and may set a path of transmission of a particular file from the first relay server 520 to the second relay server set 530, based on whether an error has occurred. For example, a particular file may be directly transmitted from the first relay server 520 to each of the second relay server set 530, or a particular file may be transmitted via another relay server included in the first relay server set. For example, when an error has occurred in a communication path that directly connects the first relay server 520 and one server in the second relay server set 530, a particular file may need to be transmitted from the first relay server 520 to the one server in the second relay server set 530 via another relay server. For example, when an error has occurred in some communication paths within the first relay server set, a particular file may need to be transmitted from the first relay server 520 to the second relay server set 530 while bypassing the communication paths in which the error has occurred. That is, based on an error occurring in at least part of a communication path within the first relay server set, the electronic apparatus 510 may bypass the communication path in which the error has occurred so as to set a path such that a particular file can be transmitted from the first relay server 520 to each of the second relay server set 530. In addition, based on the distance between the first relay server set, the electronic apparatus 510 may set a path such that a particular file can be transmitted from the first relay server 520 to each of the second relay server set 530 in a shortest period of time.

In an embodiment, the electronic apparatus 510 may delete a particular file from the second relay server set 530 if a preset time elapses since a time (timepoint) regarding a transmission request or upload. The electronic apparatus 510 may secure a storage space of the second relay server set 530 by deleting a particular file from the second relay server set 530 if a preset time elapses since a time regarding a transmission request or upload. For example, the time (timepoint) regarding a transmission request or upload may be a timepoint at which a request for transmission of a particular file is input to the transmitting terminal, a timepoint at which the request for transmission of a particular file is transferred to the electronic apparatus 510, a timepoint at which the first relay server 520 is determined by the electronic apparatus 510, a timepoint at which information of the first relay server 520 is transferred to the transmitting terminal, or a timepoint at which a particular file is uploaded to the first relay server 520 by the transmitting terminal. As another example, the electronic apparatus 510 may delete a particular file from the second relay server set 530 if a preset time elapses since a timepoint at which the second relay server set 530 is determined by the electronic apparatus 510, a timepoint at which information of the second relay server set 530 is transferred to the first relay server 520 by the electronic apparatus 510, or a timepoint at which a particular file is transferred to the second relay server set 530 by the first relay server 520. For example, the preset time may be 48 hours, and may be adjusted by the transmitting user via the transmitting terminal according to a request for transmission of a particular file.

Figure 6:
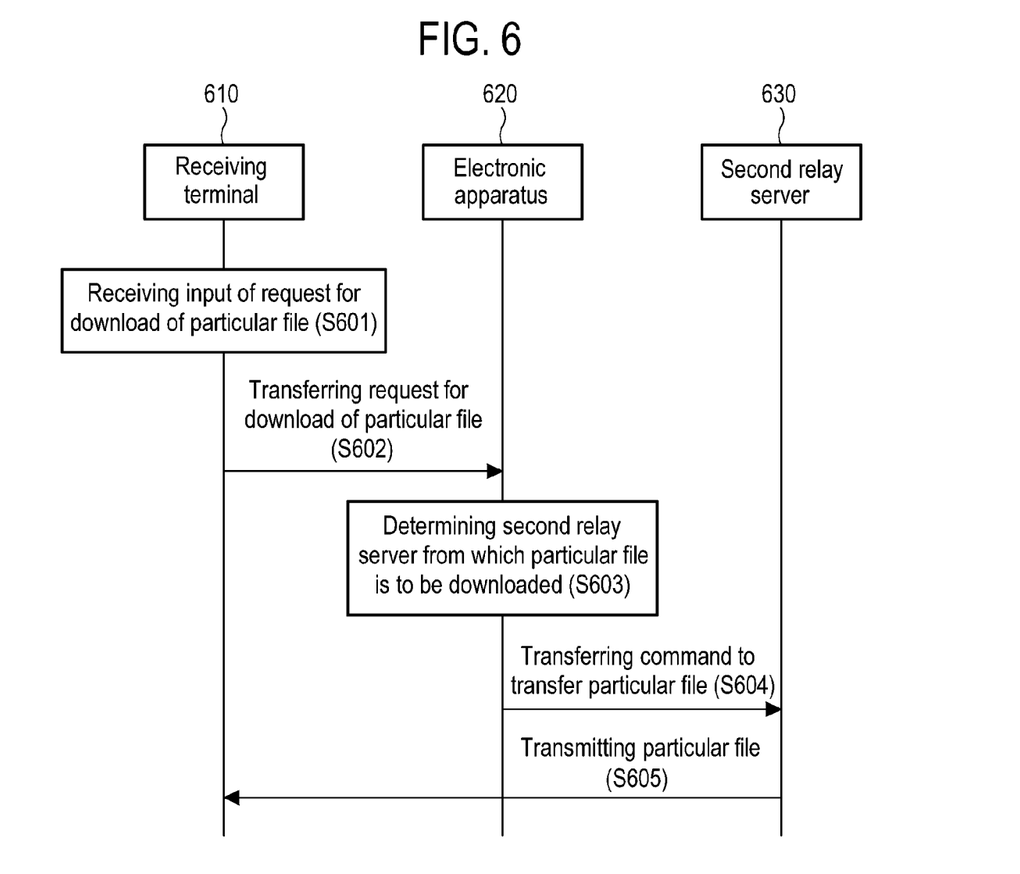
FIG. 6 illustrates operations of an electronic apparatus according to an embodiment of the present disclosure.

FIG. 6 illustrates operations of an electronic apparatus 620 according to an embodiment of the present disclosure. The receiving terminal 610 may receive an input of a request for download of a particular file from the receiving user (S601). In an embodiment, the receiving terminal 610 may receive an input of a request for download of a particular file from the receiving user via a link or a PIN number, which instructs download of a particular file. For example, the receiving user may click a link transferred to the receiving terminal 610 via an electronic message or the like, or may input the link to the address bar of a web site, thereby inputting a download request to the receiving terminal 610. For example, the receiving user may input the PIN number to the UI of the file transmission service provided via the receiving terminal 610, thereby inputting a download request to the receiving terminal 610. In response to the input of a request for download of a particular file, the receiving terminal 610 may transfer the request for download of a particular file to the electronic apparatus 620 (S602).

In response to receiving a request for download of a particular file from the receiving terminal 610, the electronic apparatus 620 may determine a second relay server 630 from which a particular file is to be downloaded by the receiving terminal 610, among the second relay server set (S603). In an embodiment, the electronic apparatus 620 may determine a second relay server 630 from which a particular file is to be downloaded by the receiving terminal 610, based on the location of the receiving terminal 610.

In an embodiment, the electronic apparatus 620 may determine a relay server closest to the receiving terminal 610, among the second relay server set, as a second relay server 630, based on the location of the receiving terminal 610 and a location of the second relay server. The closer the receiving terminal 610 is geographically to the second relay server 630 from which a particular file is to be downloaded, the shorter the time necessary to download the particular file may be. Specifically, the electronic apparatus 620 may calculate the distance between the receiving terminal 610 and each one in the second relay server set, based on the location of the receiving terminal 610 and locations of the second relay server set, and may determine a relay server having the smallest calculated distance as the second relay server 630. In another embodiment, the electronic apparatus 620 may determine the second relay server 630, additionally based on traffic processed by relay servers. For example, the electronic apparatus 620 may determine a relay server closest to the receiving terminal 610, among relay servers which are included in the second relay server set, and the traffic of which is below a specific level, as the second relay server 630.

The electronic apparatus 620 may generate a command to transmit a particular file, and may transmit the generated command to transmit a particular file to the second relay server 630 (S604). As another example, the electronic apparatus 620 may transfer information of the second relay server 630 to the receiving terminal 610, and the receiving terminal 610 may directly transfer the command to transmit a particular file to the second relay server 630. In response to receiving the command to transmit a particular file, the second relay server 630 may transmit a particular file to the receiving terminal 610 (S605).

In an embodiment, the electronic apparatus 620 may add a relay server in a geographical area corresponding to the location of the receiving terminal 610 to the second relay server set. The electronic apparatus 620 may additionally store a particular file in a relay server in the geographical area corresponding to the location of the receiving terminal 610. Specifically, the electronic apparatus 620 may transfer a command to transmit a particular file to a relay server in the geographical area corresponding to the location of the receiving terminal 610, to a first relay server in which a particular file is prestored, or to a relay server included in the existing second relay server set. That is, even if the particular file is not stored in a relay server in the geographical area corresponding to the location of the receiving terminal 610, the receiving terminal 610 may download the particular file, and the particular file may then be stored in a relay server in the geographical area corresponding to the location of the receiving terminal 610. Therefore, when a user terminal in the corresponding area requests download of the particular file at a later time, a higher download rate may be provided. By such an operation, the electronic apparatus 620 may efficiently manage the storage space or traffic of relay servers and provide a high download rate when there is a high possibility that a user or a terminal in the same area will request download of the same file.

Figure 7:
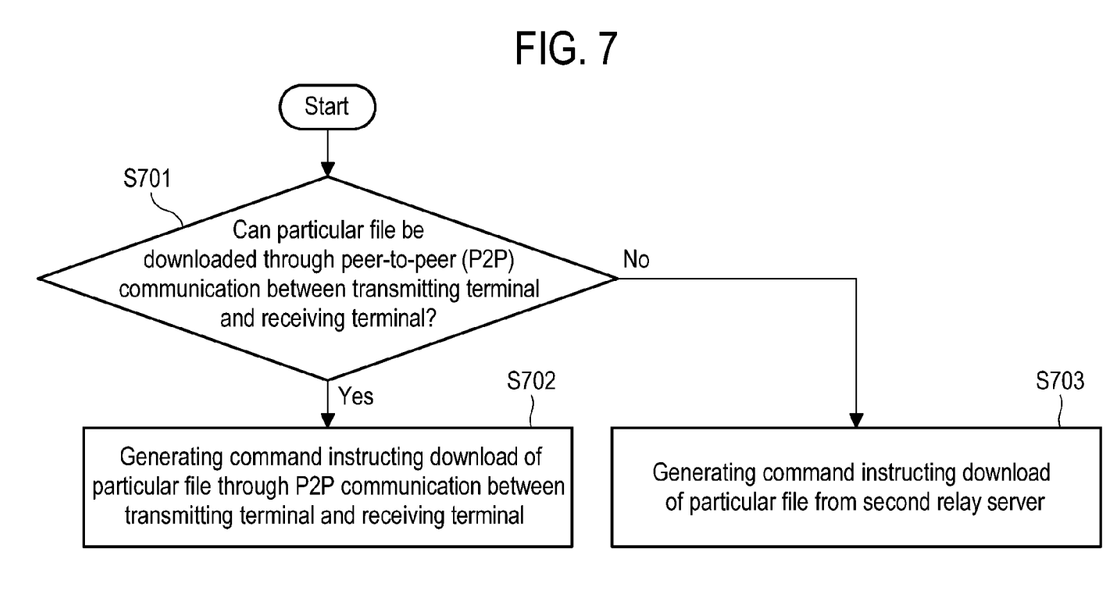
FIG. 7 illustrates operations of an electronic apparatus according to an embodiment of the present disclosure.

FIG. 7 illustrates operations of an electronic apparatus according to an embodiment of the present disclosure. In an embodiment, the electronic apparatus may determine whether a particular file can be downloaded via peer-to-peer (P2P) communication between a transmitting terminal and a receiving terminal. For example, operation S701 may be performed after operation S602 in FIG. 6. In an embodiment, when the transmitting terminal and the receiving terminal are connected to the same network, the electronic apparatus may determine that a particular file can be downloaded via P2P communication between the transmitting terminal and the receiving terminal. The description that the transmitting terminal and the receiving terminal are connected to the same network may mean that the transmitting terminal and the receiving terminal are connected via the same sharing device or router. In an embodiment, the electronic apparatus may determine whether a particular file can be downloaded via P2P communication between the transmitting terminal and the receiving terminal, based on a ping test between the transmitting terminal and the receiving terminal.

When it is determined that a particular file can be downloaded via P2P communication between the transmitting terminal and the receiving terminal, the electronic apparatus may generate a command instructing download of a particular file via P2P communication between the transmitting terminal and the receiving terminal, instead of downloading the particular file from the second relay server (S702). In the present case, the electronic apparatus may transfer the command instructing download of a particular file via P2P communication between the transmitting terminal and the receiving terminal to the receiving terminal or the transmitting terminal. The rate at which a particular file is downloaded via P2P communication between the transmitting terminal and the receiving terminal may be higher than the rate at which the transmitting terminal downloads the particular file via a relay server. Therefore, when the particular file can be downloaded via P2P communication between the transmitting terminal and the receiving terminal, the electronic apparatus may cause the transmitting terminal to download the particular file at a higher rate via P2P communication. When it is determined that the particular file cannot be downloaded via P2P communication between the transmitting terminal and the receiving terminal, the electronic apparatus may generate a command instructing download of the particular file from the second relay server (S703).

Figure 8:
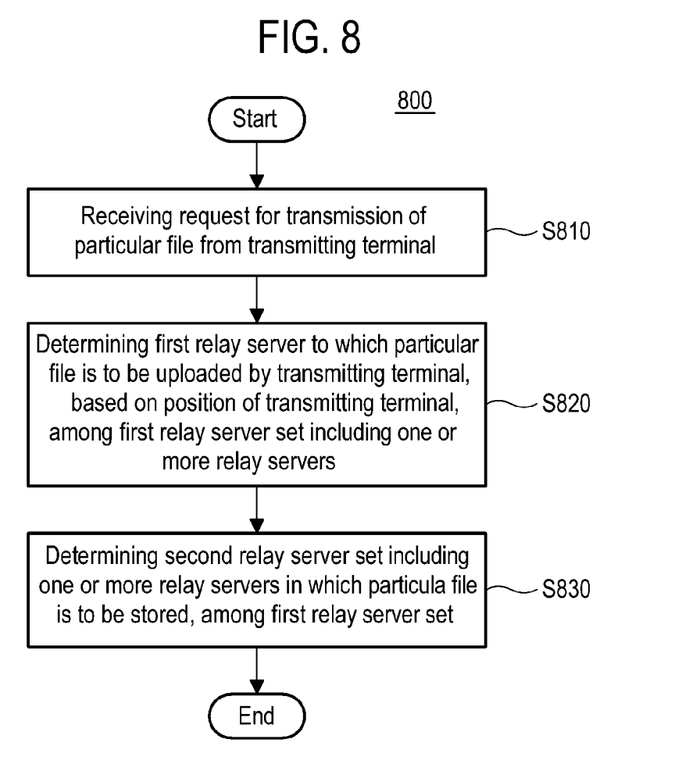
FIG. 8 is a flowchart illustrating operations of a method according to an embodiment of the present disclosure.

FIG. 8 is a flowchart illustrating operations of a method according to an embodiment of the present disclosure. The method 800 may be a method for providing a file transmission service, and may be performed by the above-described electronic apparatus. Referring to FIG. 8, the method 800 may include an operation (S810) of receiving a request for transmission of a particular file from a transmitting terminal, an operation (S820) of determining a first relay server to which the transmitting terminal is to upload a particular file, based on the location of the transmitting terminal, among a first relay server set including one or more relay servers, and an operation (S830) of determining a second relay server set including one or more relay servers, in which the particular file is to be stored, among the first relay server set.

In an embodiment, operation S820 may include determining a relay server closest to the transmitting terminal, among the first relay server set, as a first relay server, based on the location of the transmitting terminal and the locations of the first relay server set.

In an embodiment, operation S830 may include determining a second relay server set, based on the location of a specified receiving terminal, when the receiving terminal is specified based on a request for transmission of a particular file.

In an embodiment, operation S830 may include determining a second relay server set including a relay server in a geographical area corresponding to the location of the transmitting terminal.

In an embodiment, operation S810 may include receiving information regarding a specific geographic area, together with the transmission request, from the transmitting terminal, and operation S830 may include determining the second relay server set, based on the specific geographic area.

In an embodiment, the method 800 may further include receiving a request for download of a particular file from the receiving terminal, and determining a second relay server from which the receiving terminal is to download a particular file, based on the location of the receiving terminal, among the second relay server set, in response to receiving the download request. The receiving a request for download of a particular file from the receiving terminal may include receiving the download request from the receiving terminal via a link instructing download of the particular file generated in response to a request for transmission of a particular file, or receiving the download request from the receiving terminal via a PIN number instructing download of the particular file generated in response to a request for transmission of a particular file. In addition, the determining the second relay server may include determining a relay server closest to the receiving terminal, among the second relay server set, as the second relay server, based on the location of the receiving terminal and the location of the second relay server set.

In an embodiment, the method 800 may include determining whether a particular file can be downloaded via peer-to-peer (P2P) communication between the transmitting terminal and the receiving terminal, and generating a command instructing download of the particular file via P2P communication between the transmitting terminal and the receiving terminal, instead of downloading the particular file from the second relay server, when the particular file can be downloaded via P2P communication between the transmitting terminal and the receiving terminal. The determining whether a particular file can be downloaded via P2P communication between the transmitting terminal and the receiving terminal may include determining that the particular file can be downloaded via P2P communication between the transmitting terminal and the receiving terminal when the transmitting terminal and the receiving terminal are connected to the same network.

In an embodiment, the method 800 may further include adding a relay server in a geographical area corresponding to the location of the receiving terminal to the second relay server set. In an embodiment, the method 800 may further include deleting a particular file from the second relay server set if a preset time elapses since a time regarding a transmission request or upload. In an embodiment, the method 800 may further include determining whether an error has occurred in at least part of a communication path between the first relay server set, and setting a path of transmission of a particular file from the first relay server to the second relay server set, based on whether an error has occurred.

Although respective operations of methods or algorithms have been described in a successive order with reference to flowcharts according to the present disclosure, respective operations may not only be performed successively, but also be performed in an any combinable order. Descriptions regarding flowcharts of the present disclosure do not exclude changes or modifications applied to methods or algorithms, and do not mean that a specific operation is essential or preferable. In an embodiment, at least some operations may be performed in a parallel, repetitively, or heuristic manner. In another embodiment, at least some operations may be omitted, or other operations may be added.

Figure 9:
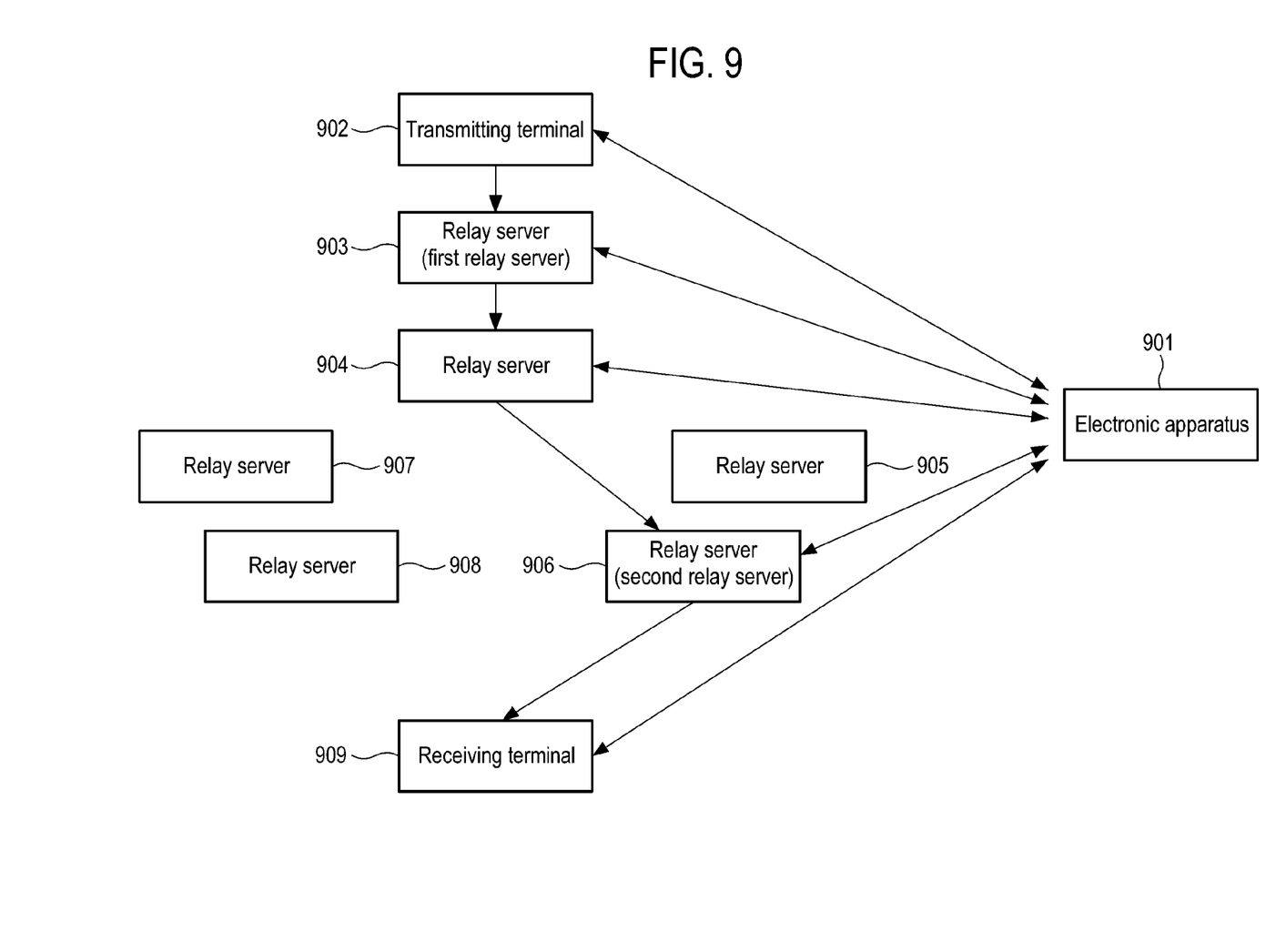
FIG. 9 illustrates operations of an electronic apparatus according to an embodiment of the present disclosure.

FIG. 9 illustrates operations of an electronic apparatus 901 according to an embodiment of the present disclosure. The electronic apparatus 901 may communicate with a transmitting terminal 902, a first relay server set 903 to 908, and a receiving terminal 909. Although a single electronic apparatus 901 is illustrated in the drawing, electronic apparatuses 901 may exist in multiple geographical areas so as to communicate with at least some of the transmitting terminal 902, the first relay server set 903 to 908, and the receiving terminal 909, respectively.

The first relay server set 903 to 908 may include multiple relay servers including a first relay server 903, and may exist in multiple geographical areas in a distributed manner. For example, it may be assumed that the transmitting terminal 902 and the relay server 903 may exist in country A, the relay server 904 may exist in country B, and the relay server 906 and the receiving terminal 909 may exist in country C. Upon receiving a request for transmission of a particular file from the transmitting terminal 902, the electronic apparatus 901 may determine the relay server 903 located in the same country A as the transmitting terminal 902 as the first relay server. In addition, the transmitting terminal 902 may transmit a particular file to the relay server 903. The electronic apparatus 901 may determine a second relay server set 904, 906 in view of regional characteristics. In addition, the electronic apparatus 901 may determine a path for transmitting a particular file to the second relay server set 904, 906. For example, the path for transmitting a particular file may be a path in the order of relay servers 903, 904, 906. Specifically, the electronic apparatus 901 may determine a path for transmitting a particular file, based on at least one of whether an error has occurred in communication between relay servers, traffic between relay servers, and the transmission rate. The electronic apparatus 901 may determine a path along which a particular file can be stored in the second relay server set 904, 906 within the shortest time, based on the transmission rate between relay servers. For example, assuming that a particular file is to be transmitted to a relay server 906 in country C geographically distant, if a shorter time will be taken to transmit a particular file via a relay server 904 located in country B than when directly transmitting the particular file from a relay server 903 located in country A to the relay server 906 located in country C, the electronic apparatus 901 may determine a path for transmitting a particular file in the order of relay servers 903, 904, 906. As another example, the electronic apparatus 901 may compare a path along which a particular file is transmitted in the order of relay servers 903, 906, 904 with a path along which a particular file is transmitted in the order of relay servers 903, 904, 906, thereby determining the path in the order of relay servers 903, 904, 906, which takes a shorter time, as the path for transmitting a particular file. In addition, upon receiving a request for download of a particular file from the receiving terminal 909, the electronic apparatus 901 may determine the relay server 906, which can provide the highest download rate to the receiving terminal 909, as the second relay server. In order to control transmission of a particular file between at least some of the transmitting terminal 902, the first relay server set 903 to 908, and the receiving terminal 909, the electronic apparatus 901 may transfer a command to transmit a particular file to at least some of the transmitting terminal 902, the first relay server set 903 to 908, and the receiving terminal 909.

Various embodiments of the present disclosure may be implemented as software recorded in a machine-readable storage medium which can be read by a machine. The software may be software for implementing various embodiments of the present disclosure described above. The software may be inferred from various embodiments of the present disclosure by programmers in the art to which the present disclosure pertains. For example, the software may be a program including machine-readable commands (for example, instructions, codes, or code segments). The machine refers to a device capable of operating according to a command retrieved from a storage medium, and may be a computer, for example. In an embodiment, the machine may be a computing device according to various embodiments of the present disclosure. In an embodiment, the processor of the machine may execute a retrieved command such that components of the device perform a function corresponding to the command. The storage medium may refer to any kind of recording medium which can be read by a machine, and in which data is stored. Examples of the storage medium may include a ROM, a RAM, a CD-ROM, a magnetic tape, a floppy disk, an optical data storage device, and the like. In an embodiment, the storage medium may be implemented to be distributed to computer systems or the like, which are connected via a network. The software may be distributed and stored in computer systems or the like, and then executed. In another embodiment, the storage medium may be a non-transitory storage medium. The non-transitory storage medium refers to a tangible medium which exists regardless of whether data is stored semi-permanently or temporarily, and does not include a signal that is transmitted in a transitory manner.

Although the technical spirit of the present disclosure has been described by various embodiments, the technical spirit of the present disclosure includes various substitutions, modifications, and changes which can be made without departing from the scope of the present disclosure which can be understood by those skilled in the art to which the present disclosure pertains. In addition, it should be noted that that such substitutions, modifications, and changes are intended to fall within the scope of the appended claims.

Hereinafter, various embodiments of the present disclosure will be described additionally.

[Additional description 1] An electronic apparatus including: a communication circuit which communicates with a transmitting terminal; one or more processors; and one or more memories which stores instructions which, when executed by the one or more processors, cause the one or more processors to perform computations, wherein when the instructions are executed by the one or more processors, the one or more processors receive a request for transmission of a particular file from the transmitting terminal, determine, among a first relay server set including one or more relay servers, a first relay server to which the particular file is to be uploaded by the transmitting terminal, based on a location of the transmitting terminal, and determine, among the first relay server set, a second relay server set including one or more relay servers in which the particular file is to be stored.

[Additional description 2] The electronic apparatus of additional description 1, wherein the communication circuit may communicate with a receiving terminal, and wherein the one or more processors may receive a request for download of the particular file from the receiving terminal and in response to receiving the request for download, determine, among the second relay server set, a second relay server from which the particular file is to be downloaded by the receiving terminal, based on a location of the receiving terminal.

[Additional description 3] The electronic apparatus of additional description 2, wherein the one or more processors may receive the request for download from the receiving terminal via a link instructing the download of the particular file generated in response to a request for transmission of the particular file.

[Additional description 4] The electronic apparatus of additional description 2 or 3, wherein the one or more processors may receive the request for download from the receiving terminal via a PIN number instructing download of the particular file generated in response to the request for transmission of the particular file.

[Additional description 5] The electronic apparatus of one of additional descriptions 2 to 4, wherein the one or more processors may determine whether the particular file can be downloaded via peer-to-peer (P2P) communication between the transmitting terminal and the receiving terminal, and generate, when the particular file can be downloaded via P2P communication between the transmitting terminal and the receiving terminal, a command instructing the download of the particular file via the P2P communication between the transmitting terminal and the receiving terminal instead of downloading the particular file from the second relay server.

[Additional description 6] The electronic apparatus of additional description 5, wherein the one or more processors may determine that the particular file can be downloaded via the P2P communication between the transmitting terminal and the receiving terminal when the transmitting terminal and the receiving terminal are connected to an identical network.

[Additional description 7] The electronic apparatus of one of additional descriptions 1 to 6, wherein the one or more processors may determine a relay server closest to the transmitting terminal, among the first relay server set, as the first relay server, based on locations of the transmitting terminal and the locations of the first relay server set.

[Additional description 8] The electronic apparatus of one of additional descriptions 2 to 7, wherein the one or more processors may determine a relay server closest to the receiving terminal, among the second relay server set, as the second relay server, based on the location of the receiving terminal and locations of the second relay server set.

[Additional description 9] The electronic apparatus of one of additional descriptions 2 to 8, wherein when the receiving terminal is specified based on a request for transmission of the particular file, the one or more processors may determine the second relay server set, based on a location of the specified receiving terminal.

[Additional description 10] The electronic apparatus of one of additional descriptions 1 to 9, wherein the one or more processors may determine the second relay server set including a relay server in an area corresponding to the location of the transmitting terminal.

[Additional description 11] The electronic apparatus of one of additional descriptions 2 to 10, wherein the one or more processors may add a relay server in an area corresponding to the location of the receiving terminal to the second relay server set.

[Additional description 12] The electronic apparatus of one of additional descriptions 1 to 11, wherein the one or more processors may delete the particular file from the second relay server set if a preset time elapses since a time regarding the request for transmission or upload.

[Additional description 13] The electronic apparatus of one of additional descriptions 1 to 12, wherein the one or more processors may receive information regarding a specific geographic area together with the request for transmission from the transmitting terminal, and determine the second relay server set, based on the specific geographic area.

[Additional description 14] The electronic apparatus of one of additional descriptions 1 to 13, wherein the one or more processors may determine whether an error has occurred in at least a part of a communication path within the first relay server set, and configure a path along which the particular file is transmitted from the first relay server to the second relay server set, based on whether the error has occurred.

[Additional description 15] A method including the operations of: receiving a request for transmission of a particular file from a transmitting terminal; determining a first relay server to which the particular file is to be uploaded by the transmitting terminal, based on a location of the transmitting terminal, among a first relay server set including one or more relay servers; and determining a second relay server set including one or more relay servers in which the particular file is to be stored, among the first relay server set.

What is claimed is:

1. An electronic apparatus comprising:
   a communication circuit communicating with a transmitting terminal;
   one or more processors; and
   one or more memories storing instructions which, when the instructions are executed by the one or more processors, the one or more processors:
      receive a request for transmission of a particular file from the transmitting terminal,
      determine, among a first relay server set comprising one or more relay servers, a first relay server to which the particular file is to be uploaded by the transmitting terminal, based on a location of the transmitting terminal, and
      determine, when a receiving terminal is specified based on a request for transmission of the particular file, a second relay server set comprising one or more relay servers in which the particular file is to be stored based on a location of the receiving terminal.

2. The electronic apparatus of claim 1, wherein the communication circuit communicates with a receiving terminal, and
   wherein the one or more processors:
      receive a request for download of the particular file from the receiving terminal, and
      in response to receiving the request for download, determine, among the second relay server set, a second relay server from which the particular file is to be downloaded by the receiving terminal, based on a location of the receiving terminal.

3. The electronic apparatus of claim 2, wherein the one or more processors receive the request for download from the receiving terminal via a link instructing the download of the particular file generated in response to the request for transmission of the particular file.

4. The electronic apparatus of claim 2, wherein the one or more processors receive the request for download from the receiving terminal via a PIN number instructing the download of the particular file generated in response to the request for transmission of the particular file.

5. The electronic apparatus of claim 2, wherein the one or more processors:
   determine whether the particular file can be downloaded via peer-to-peer (P2P) communication between the transmitting terminal and the receiving terminal, and
   generate, when the particular file can be downloaded via the P2P communication between the transmitting terminal and the receiving terminal, a command instructing the download of the particular file via the P2P communication between the transmitting terminal and the receiving terminal instead of downloading the particular file from the second relay server.

6. The electronic apparatus of claim 5, wherein the one or more processors determine that the particular file can be downloaded via the P2P communication between the transmitting terminal and the receiving terminal when the transmitting terminal and the receiving terminal are connected to an identical network.

7. The electronic apparatus of claim 1, wherein the one or more processors determine a relay server closest to the transmitting terminal, among the first relay server set, as the first relay server, based on the location of the transmitting terminal and locations of the first relay server set.

8. The electronic apparatus of claim 2, wherein the one or more processors determine a relay server closest to the receiving terminal, among the second relay server set, as the second relay server, based on the location of the receiving terminal and locations of the second relay server set.

9. The electronic apparatus of claim 1, wherein the one or more processors determine the second relay server set comprising a relay server in an area corresponding to the location of the transmitting terminal.

10. The electronic apparatus of claim 2, wherein the one or more processors add a relay server in an area corresponding to the location of the receiving terminal, to the second relay server set.

11. The electronic apparatus of claim 1, wherein the one or more processors delete the particular file from the second relay server set if a preset time elapses since a time regarding the request for transmission or upload.

12. The electronic apparatus of claim 1, wherein the one or more processors:
- receive information regarding a specific geographic area together with the request for transmission from the transmitting terminal, and
- determine the second relay server set, based on the specific geographic area.

13. The electronic apparatus of claim 1, wherein the one or more processors:
- determine whether an error has occurred in at least part of a communication path within the first relay server set, and
- configure a path along which the particular file is transmitted from the first relay server to the second relay server set, based on whether the error has occurred.

14. A method comprising:
- receiving a request for transmission of a particular file from a transmitting terminal;
- determining a first relay server to which the particular file is to be uploaded by the transmitting terminal, based on a location of the transmitting terminal, among a first relay server set comprising one or more relay servers; and
- determining a second relay server set comprising one or more relay servers in which the particular file is to be stored based on a location of the receiving terminal, when a receiving terminal is specified based on a request for transmission of the particular file.

* * * * *